US012060089B2

(12) United States Patent
Mitchell et al.

(10) Patent No.: US 12,060,089 B2
(45) Date of Patent: Aug. 13, 2024

(54) SPRAYING APPARATUS FOR APPLYING FRICTION MODIFYING MATERIAL TO RAILROAD RAIL

(71) Applicant: L. B. FOSTER COMPANY, Pittsburgh, PA (US)

(72) Inventors: Davey Mitchell, Pittsburgh, PA (US); David Elvidge, Pittsburgh, PA (US); Darren Loo, Pittsburgh, PA (US); Doug McKay, Pittsburgh, PA (US); Joel Vandermarel, Pittsburgh, PA (US); Nigel Davis, Pittsburgh, PA (US); Sze Kei Luk, Pittsburgh, PA (US)

(73) Assignee: L. B. Foster Company, Pittsburgh, PA (US)

( * ) Notice: Subject to any disclaimer, the term of this patent is extended or adjusted under 35 U.S.C. 154(b) by 834 days.

(21) Appl. No.: 17/133,032

(22) Filed: Dec. 23, 2020

(65) Prior Publication Data

US 2021/0253140 A1 Aug. 19, 2021

Related U.S. Application Data

(60) Provisional application No. 62/952,951, filed on Dec. 23, 2019.

(51) Int. Cl.
*B61C 15/08* (2006.01)
*B05B 7/04* (2006.01)
(Continued)

(52) U.S. Cl.
CPC .......... *B61C 15/085* (2013.01); *B05B 7/0441* (2013.01); *B05B 12/004* (2013.01);
(Continued)

(58) Field of Classification Search
CPC ..... B61C 15/085; B05B 15/58; B05B 7/0441; B05B 12/004; B05B 12/087; B05B 13/005
See application file for complete search history.

(56) References Cited

U.S. PATENT DOCUMENTS 2,586,256 A 2/1952 Quarles
4,611,789 A 9/1986 Ackert et al.
(Continued)

FOREIGN PATENT DOCUMENTS

DE 69920675 T2 * 2/2006 ........... B05B 7/1209

OTHER PUBLICATIONS

Form PCT/ISA/220, PCT Notification of Transmittal of the International Search Report and the Written Opinion of the International Searching Authority, or the Declaration, PCT/US2020/066914, Date Mailed Mar. 8, 2021.
(Continued)

*Primary Examiner* — Robert J McCarry, Jr.
(74) *Attorney, Agent, or Firm* — Paul D. Bangor, Jr., Esq.; Clark Hill PLC

(57) ABSTRACT

A spraying apparatus for applying a friction modifying fluid to a railroad rail, comprising: a nozzle body disposed in a housing; a fluid inlet conduit in fluid communication with an opening in housing; a fluid inlet disposed in the housing in fluid communication with a first fluid conduit defined by or disposed in the nozzle body; wherein the first fluid conduit runs from fluid inlet to a hollow nozzle tip body disposed on and protruding through a bottom of housing and wherein fluid inlet is also disposed below, and in fluid communication with, the fluid inlet conduit; a control fluid supply line and an atomizing fluid supply line each partially disposed in the housing and each having respective portions external of the housing for connecting with the same fluid supply or
(Continued)

respective fluid supplies; wherein the control fluid supply line injects a pressurized control fluid against a piston assembly disposed in a piston cavity; wherein the piston assembly carries stopper needle which is biased towards hollow nozzle tip body by a spring so that the needle closes a nozzle tip opening of hollow nozzle tip body; wherein the atomizing fluid supply line provides a pressurized atomizing fluid into hollow nozzle tip body to atomize the first fluid supplied by the first fluid conduit into the hollow nozzle tip body via a fluid cap disposed on the hollow nozzle tip body; wherein in operation the control fluid supply line and the atomizing fluid supply line are operated simultaneously while the first fluid is supplied by the first fluid conduit into the hollow nozzle tip body via a fluid cap such that the pressurized control fluid injected by control fluid supply line against a piston assembly displaces needle out of the nozzle tip opening and allows the first fluid to exit out of the nozzle tip opening where the first fluid is atomized by the pressurized atomizing fluid supplied by the atomizing fluid supply line.

18 Claims, 5 Drawing Sheets

(51) Int. Cl.
*B05B 12/00* (2018.01)
*B05B 12/08* (2006.01)
*B05B 13/00* (2006.01)
*B05B 15/58* (2018.01)

(52) U.S. Cl.
CPC .......... *B05B 12/087* (2013.01); *B05B 13/005* (2013.01); *B05B 15/58* (2018.02)

(56) References Cited

U.S. PATENT DOCUMENTS

2005/0244585 A1 11/2005 Schmeling
2013/0206862 A1 8/2013 Worden et al.
2019/0276058 A1 9/2019 Suciu et al.

OTHER PUBLICATIONS

Form PCT/ISA/210, PCT International Search Report for International Application No. PCT/US2020/066914, Date Mailed Mar. 8, 2021.
Form PCT/ISA/237, PCT Written Opinion of the International Searching Authority for International Application No. PCT/US2020/066914, Date Mailed Mar. 8, 2021.
Form PCT/IB/326, PCT Notification Concerning Transmittal of International Preliminary Report on Patentability, PCT/US2020/066914, Date Mailed Jul. 7, 2022.
Form PCT/IB/373, PCT International Preliminary Report on Patentability for International Application No. PCT/US2020/066914, Date Mailed Jul. 7, 2022.

* cited by examiner

SPRAYING APPARATUS FOR APPLYING FRICTION MODIFYING MATERIAL TO RAILROAD RAIL

TECHNICAL FIELD OF THE INVENTION

The present disclosure generally relates to the field of nozzles and spraying devices and more specifically to nozzles and spraying devices for applying friction modifying material to railroad rails.

BACKGROUND OF THE DISCLOSURE

Management of friction between railroad rails and train wheels is critical for efficient railway operations. Friction modifiers are designed to be applied on the head of the rail to achieve a controlled level of friction between railroad rails and train wheels. Spraying a friction modifier on the head of the rail from a running train is one way to deliver a friction modifier to its target application area. Spraying a liquid friction modifier on the rail from a moving train presents various design and engineering challenges, one of which is the unavailability of a nozzle system that can withstand the operational environment under a moving train while fulfilling its design function. The present disclosure aims to close this gap by creating a novel and unique spray nozzle assembly that can be used under a moving train with minimum maintenance and offer an opportunity to spray friction modifiers on rails reliably.

Spraying friction modifiers on rails, particularly water-based friction modifiers, presents unique challenges. Change in viscosity of material as a result of changing operational temperatures is one, which requires temperature control of the material as it runs through a nozzle assembly. The physical space under a train is usually very minimal and not easily accessible. Furthermore, any nozzle assembly installed under a train will be exposed to high amount shock and vibration under varying environmental conditions. These constraints require the nozzle assembly to be packaged in a tight and optimized geometry with minimum weight. Commonly available spray nozzle systems are heavy and bulky, usually made of steel, not well suited for mobile application.

Further limitations and disadvantages of conventional and traditional spraying devices and nozzles will become apparent to one of skill in the art through comparison of such devices with the present disclosure as set forth in the remainder of the present application with reference to the drawings.

BRIEF SUMMARY

The present disclosure preferably is directed to a spray nozzle assembly that receives liquid and air near the outlet of the nozzle, spraying out an air-atomized liquid to its target. In a preferred embodiment of the present disclosure, the liquid enters from the top of a housing of the spraying apparatus and goes through an insulated nozzle body where it is heated to control its viscosity as necessary using a temperature feedback system, and it gets mixed with air near the outlet of the nozzle. The preferred design also incorporates a duckbill valve that closes under non-spray conditions preventing the liquid staying behind it from drying out. In addition, there is a purge cap surrounding the nozzle tip to prevent high velocity air on a moving train pushing unwanted solid particles such as dust and sand or similar to the nozzle tip, preventing the tip from getting clogged by such media. In addition, the purge cap is disposed around the nozzle tip body and the nozzle tip opening to limit overspray and reduce depositing of particles of atomized friction modifying material onto the nozzle tip to reduce clogging the nozzle tip opening from the cross winds and air flow patterns outside of a moving train on which the spraying apparatus is mounted.

Many other variations are possible with the present disclosure, and those and other teachings, variations, and advantages of the present disclosure will become apparent from the description and figures of the disclosure.

One aspect of a preferred embodiment of the present disclosure comprises a spraying apparatus for applying a friction modifying fluid to a railroad rail, comprising: a nozzle body disposed in a housing; a fluid inlet conduit in fluid communication with an opening in housing; a fluid inlet disposed in the housing in fluid communication with a first fluid conduit defined by or disposed in the nozzle body; wherein the first fluid conduit runs from fluid inlet to a hollow nozzle tip body disposed on and protruding through a bottom of housing and wherein fluid inlet is also disposed below, and in fluid communication with, the fluid inlet conduit; a control fluid supply line and an atomizing fluid supply line each partially disposed in the housing and each having respective portions external of the housing for connecting with the same fluid supply or respective fluid supplies; wherein the control fluid supply line injects a pressurized control fluid against a piston assembly disposed in a piston cavity; wherein the piston assembly carries stopper needle which is biased towards hollow nozzle tip body by a spring so that the needle closes a nozzle tip opening of hollow nozzle tip body; wherein the atomizing fluid supply line provides a pressurized atomizing fluid into hollow nozzle tip body to atomize the first fluid supplied by the first fluid conduit into the hollow nozzle tip body via a fluid cap disposed on the hollow nozzle tip body; wherein in operation the control fluid supply line and the atomizing fluid supply line are operated simultaneously while the first fluid is supplied by the first fluid conduit into the hollow nozzle tip body via a fluid cap such that the pressurized control fluid injected by control fluid supply line against a piston assembly displaces needle out of the nozzle tip opening and allows the first fluid to exit out of the nozzle tip opening where the first fluid is atomized by the pressurized atomizing fluid supplied by the atomizing fluid supply line.

In another aspect, a preferred spraying apparatus of the present disclosure further comprises a check valve disposed over the nozzle tip opening to prevent air from drying out the first fluid in the nozzle tip opening when the spraying apparatus.

In yet another aspect, a preferred spraying apparatus of the present disclosure further comprises a purge cap disposed around the nozzle tip body and the nozzle tip opening to limit overspray and reduce depositing of particles of atomized first fluid onto the nozzle tip to reduce clogging the nozzle tip opening from the cross winds and air flow patterns outside of a moving train on which the spraying apparatus is mounted.

In another aspect, a preferred spraying apparatus of the present disclosure further comprises a wind skirt attached to or integral with the housing and extending down and surrounding the purge cap, nozzle tip body and the nozzle tip opening.

In another aspect of a preferred spraying apparatus of the present disclosure, the wind skirt has a first side, a second side and a third side.

In another aspect, a preferred spraying apparatus of the present disclosure further comprises a heating element disposed in the nozzle body for heating nozzle body and a first fluid disposed in fluid inlet and/or in the first fluid conduit therein.

In another aspect, a preferred spraying apparatus of the present disclosure further comprises a temperature sensor disposed within the housing.

In another aspect, a preferred spraying apparatus of the present disclosure, the temperature sensor comprises a resistance temperature detector (RTD).

In yet another aspect, a preferred spraying apparatus of the present disclosure, the temperature sensor is in contact with the first fluid conduit and/or the first fluid contained therein for measuring the temperature of the first fluid disposed therein.

In a further aspect, a preferred spraying apparatus of the present disclosure, the RTD is in contact with the first fluid conduit and/or the first fluid contained therein for measuring the temperature of the first fluid disposed therein.

In another aspect, a preferred spraying apparatus of the present disclosure, the first fluid comprises a friction modifying fluid for railroad rails.

In yet another aspect, a preferred spraying apparatus of the present disclosure, the first fluid comprises a water-based friction modifying fluid for railroad rails.

In another aspect, a preferred spraying apparatus of the present disclosure, each of the control fluid and the atomizing fluid comprises air.

In yet another aspect, a preferred spraying apparatus of the present disclosure, the nozzle body is surrounded by an insulating material.

In an additional aspect, a preferred spraying apparatus of the present disclosure, the nozzle body is surrounded by a closed cell elastomeric foam insulating material.

In another aspect, a preferred spraying apparatus of the present disclosure, the nozzle body is made of aluminum.

BRIEF DESCRIPTION OF THE SEVERAL VIEWS OF THE DRAWINGS

For the present disclosure to be easily understood and readily practiced, the present disclosure will now be described for purposes of illustration and not limitation in connection with the following figures, wherein.

DETAILED DESCRIPTION

In the following detailed description, reference is made to the accompanying examples and figures that form a part hereof, and in which is shown, by way of illustration, specific embodiments in which the inventive subject matter may be practiced. These embodiments are described in sufficient detail to enable those skilled in the art to practice them, and it is to be understood that other embodiments may be utilized and that structural or logical changes may be made without departing from the scope of the inventive subject matter. Such embodiments of the inventive subject matter may be referred to, individually and/or collectively, herein by the term "disclosure" merely for convenience and without intending to voluntarily limit the scope of this application to any single inventive concept if more than one is in fact disclosed.

The following description is, therefore, not to be taken in a limited sense, and the scope of the inventive subject matter is defined by the appended claims and their equivalents.

Figure 3:
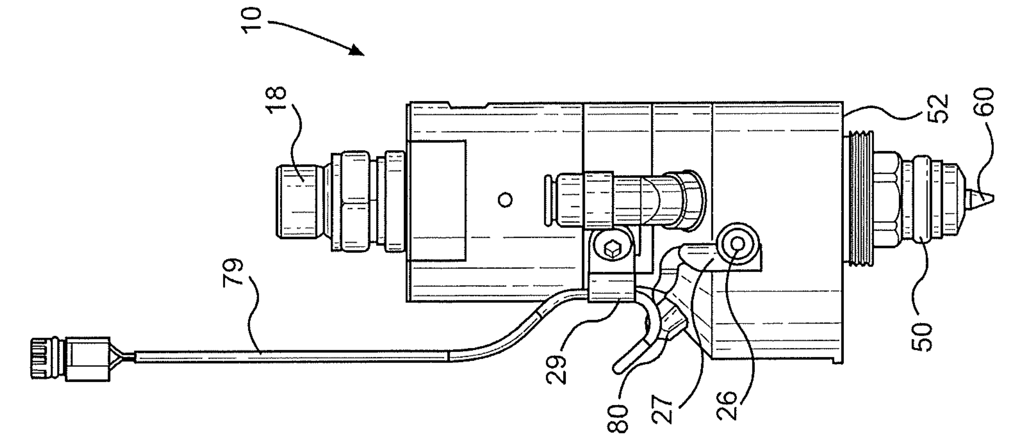
FIG. 3 is yet another plan view of a preferred embodiment of a spraying apparatus of the present disclosure.
Figure 2:
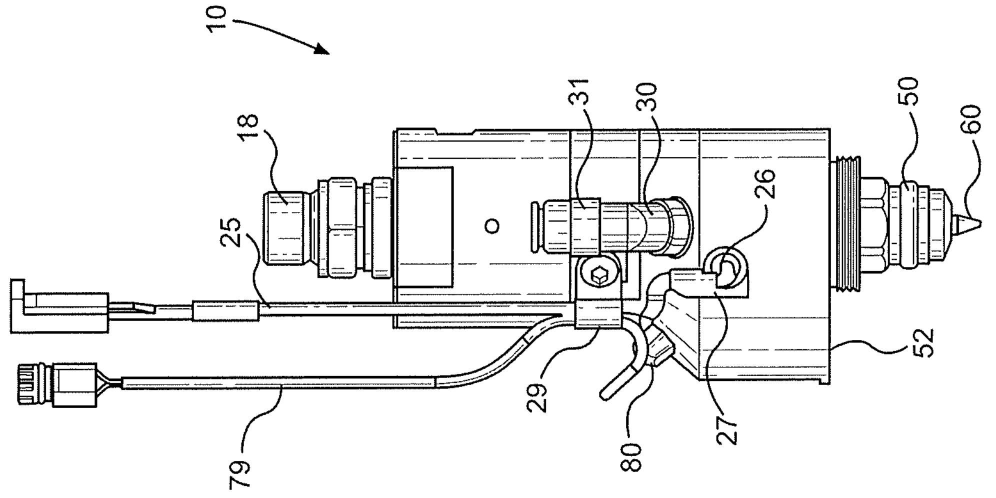
FIG. 2 is another plan view of a preferred embodiment of a spraying apparatus of the present disclosure.
Figure 1:
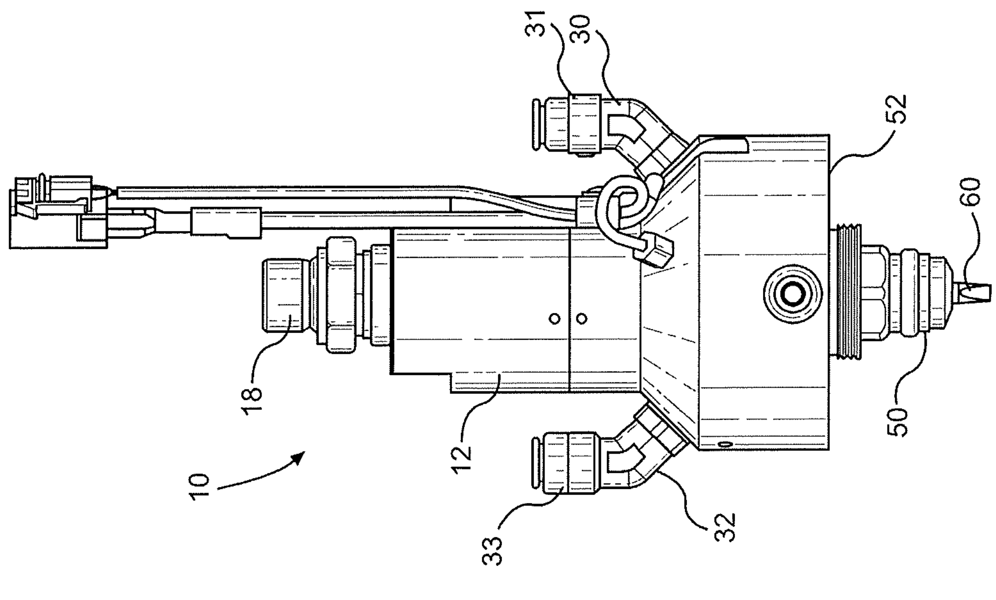
FIG. 1 is a plan view of a preferred embodiment of a spraying apparatus of the present disclosure.
Figure 5:
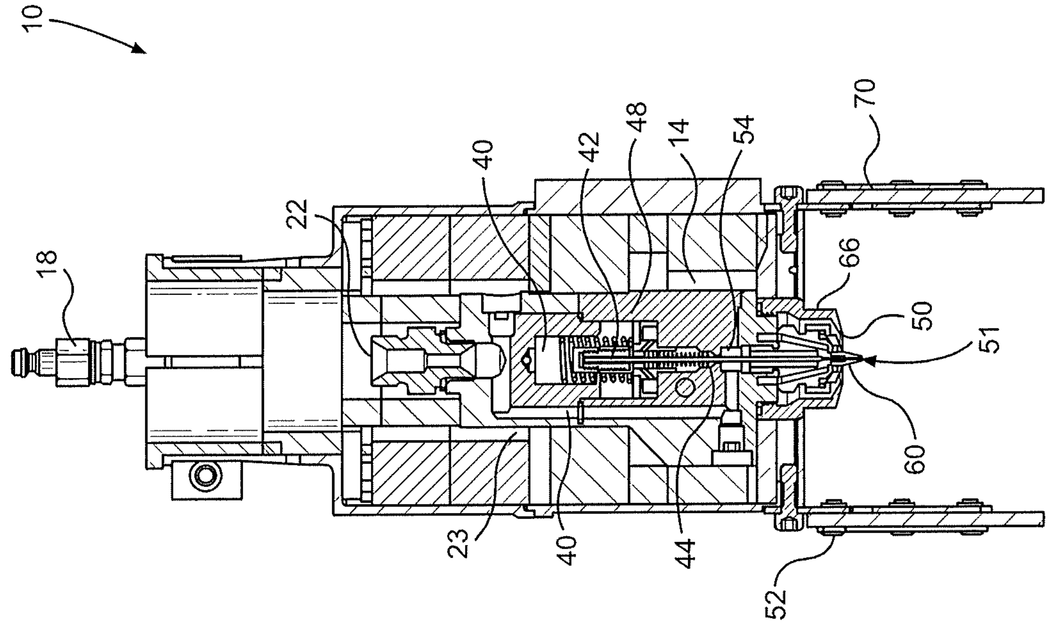
FIG. 5 is a cross-sectional view of the spraying apparatus of FIG. 4 along line A-A of FIG. 4.
Figure 4:
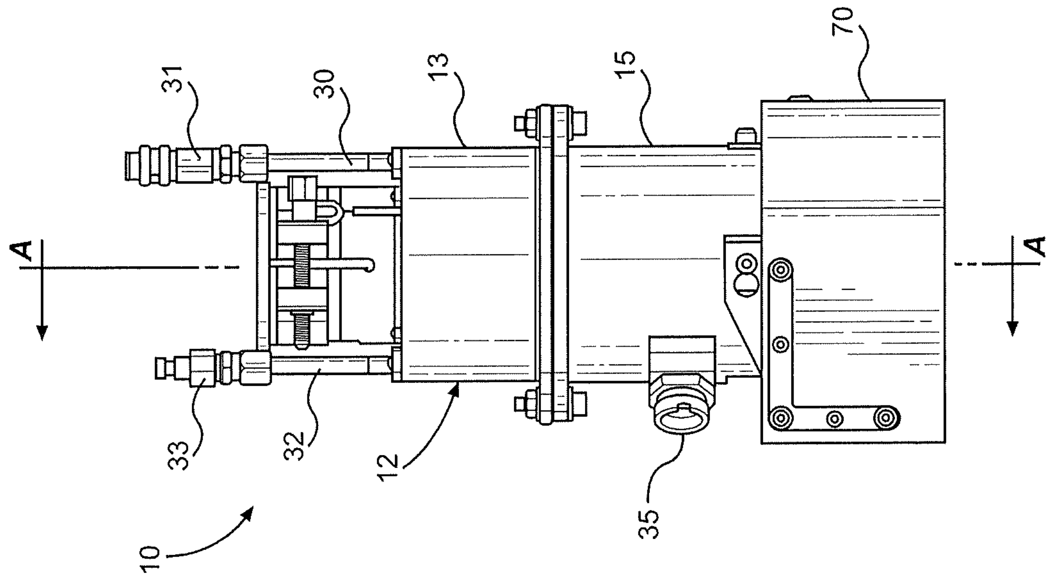
FIG. 4 is yet another plan view of a preferred embodiment of a spraying apparatus of the present disclosure.
Figure 7:
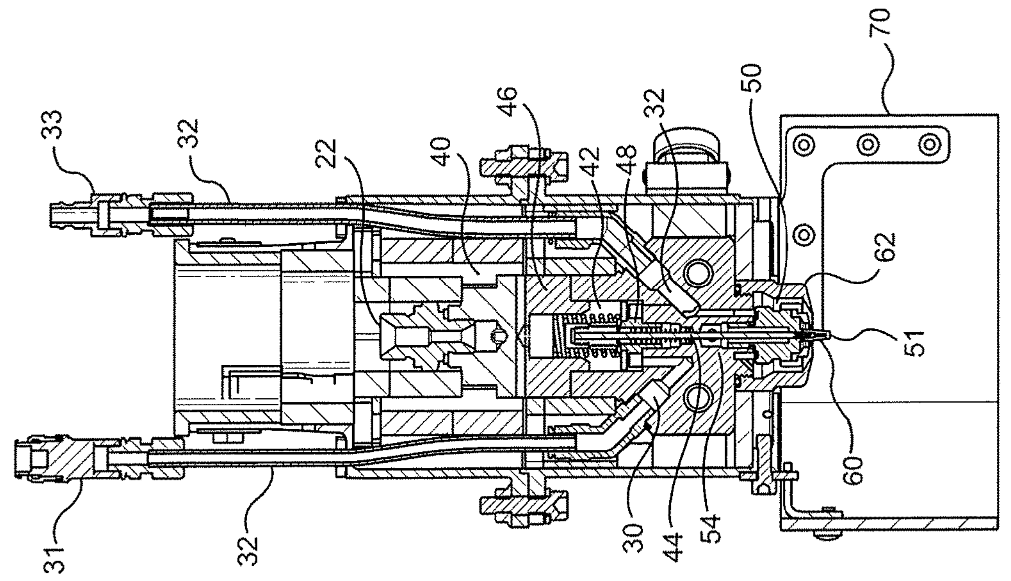
FIG. 7 is a cross-sectional view of the spraying apparatus of FIG. 6 along line A-A of FIG. 6.
Figure 6:
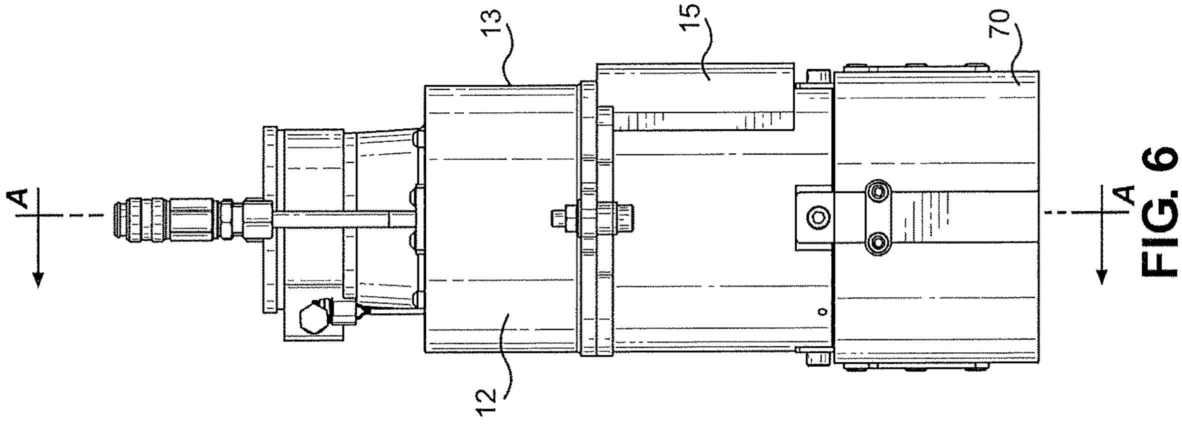
FIG. 6 is another plan view of a preferred embodiment of a spraying apparatus of the present disclosure.
Figure 9:
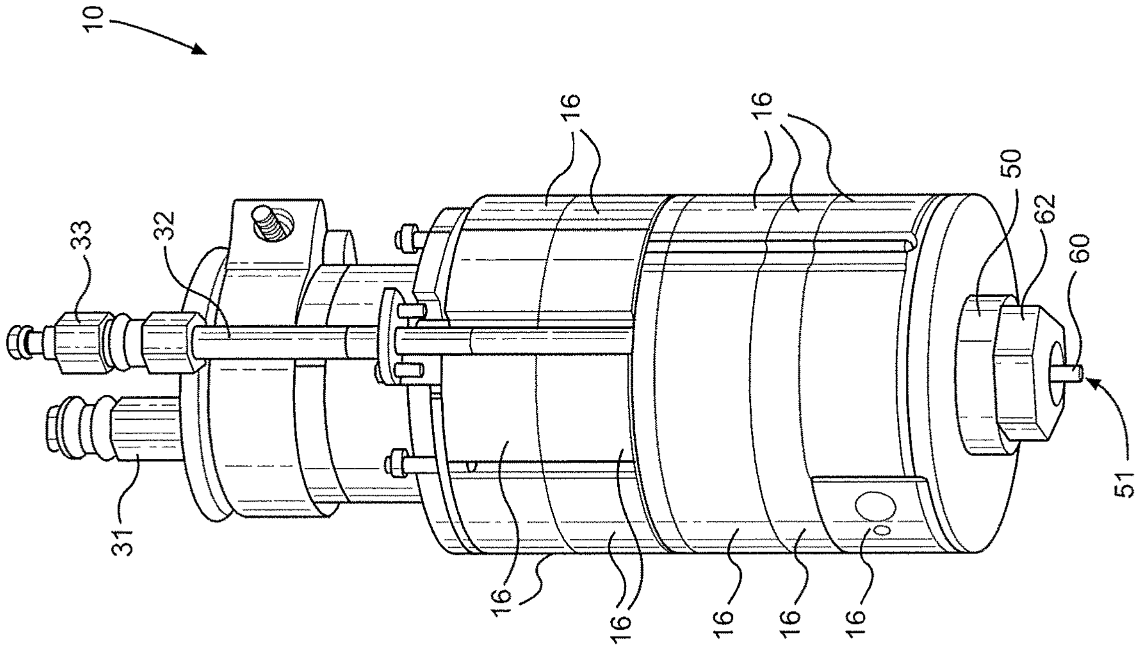
FIG. 9 is a bottom perspective view of a preferred embodiment of a spraying apparatus of the present disclosure with its outer housing removed for illustration of several internal components.
Figure 8:
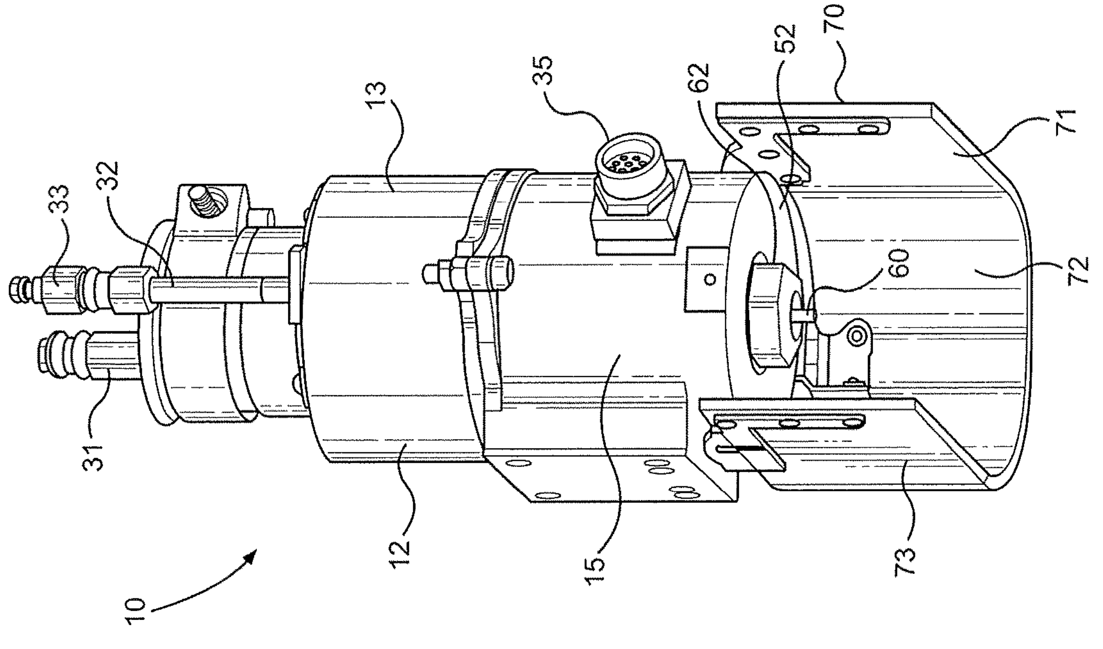
FIG. 8 is a bottom perspective view of a preferred embodiment of a spraying apparatus of the present disclosure.
Figure 11:
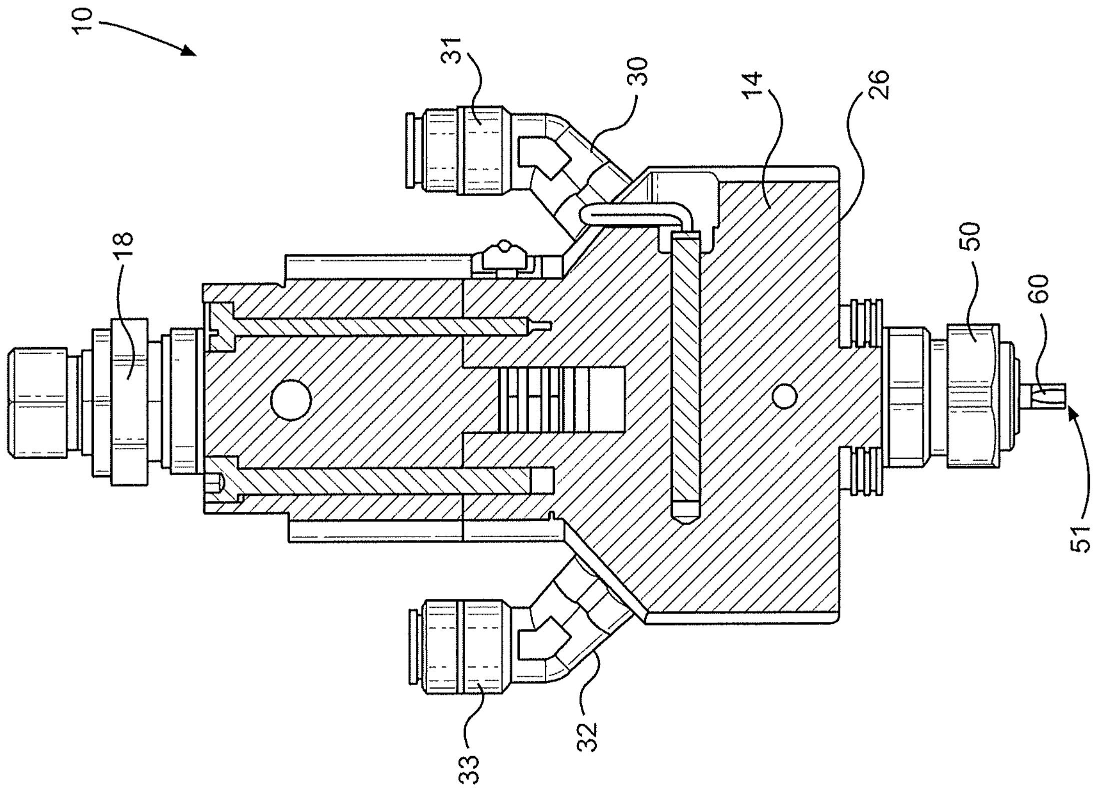
FIG. 11 is a cross-sectional view of the spraying apparatus of FIG. 10 along line A-A of FIG. 10.
Figure 10:
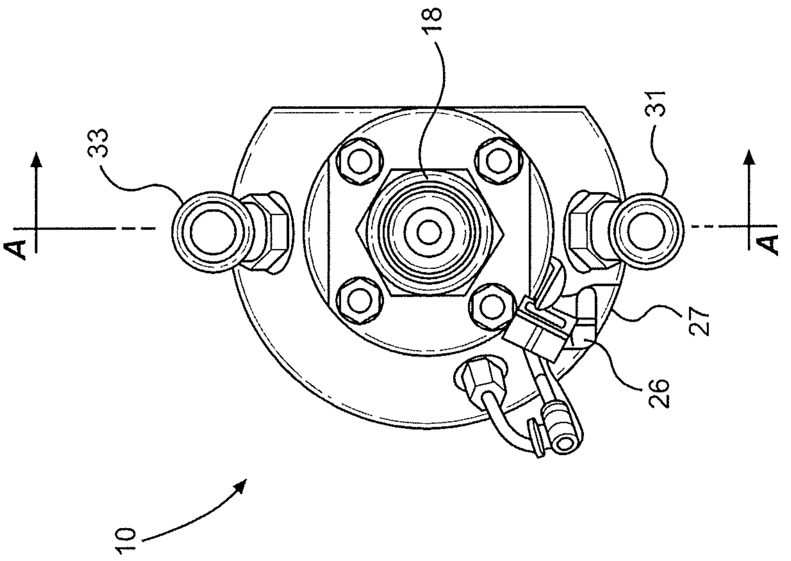
FIG. 10 is a partial top plan view of a preferred embodiment of a spraying apparatus of the present disclosure.

Referring to FIGS. 1-11, a preferred embodiment of a spraying apparatus 10 for applying a friction modifying fluid to a railroad rail of the present disclosure comprises nozzle body 14 surrounded by insulating material 16, preferably fiber-free, closed cell elastomeric foam insulation, and disposed in a housing 12 preferably comprising aluminum. Insulating material 16 preferably provides thermal insulation in addition to dampening mechanical vibrations and shock that spraying apparatus 10 may experience in service. Nozzle body 14 is preferably made of aluminum or other suitable lightweight materials. Preferably, housing 12 has an upper section 13 and a lower section 15 both of which are preferably made of aluminum. Fluid inlet tube/line/conduit 18 is in fluid communication with an opening 20 which is preferably disposed or defined in or near the top 21 of the housing 12. Opening 20 may also be preferably disposed or defined in other sections of housing 12, such as an upper section 13 or lower section 15 of housing 12. Fluid inlet 22 is disposed or defined in the housing 12 preferably above, and but in all cases, in fluid communication with first fluid conduit 23 defined by or disposed in the nozzle body 14. First fluid conduit 23 runs from fluid inlet 22 to a hollow nozzle tip body 50 disposed on and protruding through a bottom 52 of housing 12 and wherein fluid inlet 22 is also disposed below, and in fluid communication with, the fluid inlet tube/line/conduit 18.

Spraying apparatus 10 also comprises a control fluid supply line 30 and an atomizing fluid supply line 32 each partially disposed in the housing 12 and each having respective portions, preferably quick connectors 31 and 33, respectively, external of the housing 12 for connecting with the same fluid supply or respective fluid supplies.

In operation, a pressurized control fluid, preferably air, is injected through the control fluid supply line 30 against a piston assembly 42 disposed in a piston cavity 40 defined by nozzle body 14 wherein the piston assembly 42 carries stopper needle 44 which is biased towards hollow nozzle tip body 50 by spring 46 so that the needle 44 closes nozzle tip opening 51 of hollow nozzle tip body 50. In contrast, spring 48 operates to seal the friction-modifying fluid or first fluid from entering the piston cavity 40. The preferred operating range of pressurized control fluid, preferably air, through the control fluid supply line 30 is 40 to 60 psi, but should not exceed 150 psi (burst pressure).

Also in operation, atomizing fluid supply line 32 provides a pressurized atomizing fluid into hollow nozzle tip body 50 to atomize the first fluid as it exits from nozzle tip opening 51. Pressurized atomizing fluid is supplied by the first fluid conduit 23 into the hollow nozzle tip body 50. Preferably, atomizing fluid, preferably air, can be supplied through atomizing fluid supply line 32 up to a maximum air pressure of 150 psi (burst pressure).

Preferably, the control fluid supply line 30 and the atomizing fluid supply line 32 are operated simultaneously while the first fluid is supplied by the first fluid conduit 23 into the hollow nozzle tip body 50 via a fluid cap 54 such that the pressurized control fluid injected by control fluid supply line 30 against a piston assembly 42 displaces needle 44 out of the nozzle tip opening 51 while the first fluid is forced out of the nozzle tip opening 51 whereupon it is atomized and directed towards the target rail head by the pressurized atomizing fluid supplied by through atomizing fluid supply 32 line.

The spraying apparatus 10 also preferably may comprise a check valve 60 disposed over the nozzle tip opening 51 to prevent air from drying out the first fluid in the nozzle tip opening 51 when the spraying apparatus 10 is not in use applying the first fluid to a railroad rail.

The spraying apparatus 10 also preferably may comprise a purge cap 62 disposed around the nozzle tip body 50 and the nozzle tip opening 51 to reduce unwanted solid particles such as dust, sand or similar contaminants driven by air rushing past a moving train on which the spraying apparatus 10 is mounted from clogging the nozzle tip opening 51.

Additionally, spraying apparatus 10 preferably may comprise a wind skirt 70 attached to or integral with the housing 12 and extending down and surrounding the purge cap 62, nozzle tip body 50 and the nozzle tip opening 51. Wind skirt 70 preferably may comprise a first side 71, a second side 72, a third side 73, and/or a fourth side and/or other sides or portions (not shown).

The spraying apparatus 10 also preferably may comprise a heating element 26 disposed in the nozzle body 14 for heating nozzle body 14 and a first fluid disposed in fluid inlet 22 and/or in the first fluid conduit 23 therein. The spraying apparatus 10 preferably operates heating element 26 to prevent the first fluid, which preferably is a water-based friction modifying liquid, in nozzle tip opening 51 and hollow nozzle tip body 50 from freezing for temperatures down to −40 C ambient. However, the preferred operating temperature limit is −30 C ambient.

Additionally, a resistance temperature detector (RTD) 80 disposed within the housing 12 wherein the RTD 80 is in contact with the first fluid conduit 23 and/or the friction modifying fluid contained therein for measuring the temperature of the friction modifying fluid disposed therein. Preferably, RTD 80 outputs via wired or wireless means its measurements to a control system (not shown) that connects to the spraying apparatus 10 via wireless means or via a wire connection to electrical connector 35.

Power and/or communication lines 25 and 79 connect heater 26 and RTD 80, respectively, to power supply (not shown) and/or the control system (not shown) for spraying apparatus 10. Power and/or communication lines 25 and 79 preferably may be secured to housing 12 via cable clip 29 attached to housing 12. Also, slot 27 in housing 12 allows heater 26 to move within housing if it is hit or impacted by an external element while installed on a train. Slot 27 may also allow for routing the wiring where needed.

It should be understood that while the present disclosure has been described herein in terms of specific embodiments set forth in detail, such embodiments are presented by way of illustration of the general principles of the present disclosure, and the present disclosure is not necessarily limited thereto. Certain modifications and variations in any given material, process step or chemical formula will be readily apparent to those skilled in the art without departing from the true spirit and scope of the present disclosure, and all such modifications and variations should be considered within the scope of the claims that follow.

What is claimed is:

1. A spraying apparatus for applying a function modifying fluid to a railroad rail, comprising:

a nozzle body disposed in a housing;

a fluid inlet conduit in fluid communication with an opening in housing;

a fluid inlet disposed in the housing in fluid communication with a first fluid conduit defined by or disposed in the nozzle body, wherein the first fluid conduit runs from fluid inlet to a hollow nozzle tip body disposed on and protruding through a bottom of housing and wherein fluid inlet is also disposed below, and in fluid communication with, the fluid inlet conduit;

a control fluid supply line and an atomizing fluid supply line each partially disposed in the housing and each having respective portions external of the housing for connecting with the same fluid supply or respective fluid supplies;

wherein the control fluid supply line injects a pressurized control fluid against a piston assembly disposed in a piston cavity, wherein the piston assembly carries stopper needle which is biased towards hollow nozzle tip body by a spring so that the needle closes a nozzle tip opening of hollow nozzle tip body;

wherein the atomizing fluid supply line provides a pressurized atomizing fluid into hollow nozzle tip body to atomize the first fluid supplied by the first fluid conduit into the hollow nozzle tip body via a fluid cap disposed on the hollow nozzle tip body;

wherein in operation the control fluid supply line and the atomizing fluid supply line are operated simultaneously while the first fluid is supplied by the first fluid conduit into the hollow nozzle tip body via a fluid cap such that the pressurized control fluid injected by control fluid supply line against a piston assembly displaces needle out of the nozzle tip opening and allows the first fluid to exit out of the nozzle tip opening where the first fluid is atomized by the pressurized atomizing fluid supplied by the atomizing fluid supply line; and at heating element disposed in the nozzle body for heating nozzle body and a first fluid disposed in fluid inlet and/or in the first fluid conduit therein.

2. The spraying apparatus of claim 1, further comprising: a check valve disposed over the nozzle tip opening to prevent air from drying out the first fluid in the nozzle tip opening when the spraying apparatus.

3. The spraying apparatus of claim 1, further comprising: a purge cap disposed around the nozzle tip body and the nozzle tip opening to limit overspray and reduce depositing of particles of atomized first fluid onto the nozzle tip to reduce clogging the nozzle tip opening from the cross winds and air flow patterns outside of a moving train on which the spraying apparatus is mounted.

4. The spraying apparatus of claim 2, further comprising: a wind skirt attached to or integral with the housing and extending down and surrounding the purge cap, nozzle tip body and the nozzle tip opening.

5. The spraying apparatus of claim 1, further comprising: a purge cap disposed around the nozzle tip body and the nozzle tip opening to limit overspray and reduce depositing of particles of atomized first fluid onto the nozzle tip to reduce clogging the nozzle tip opening from the cross winds and air flow patterns outside of a moving train on which the spraying apparatus is mounted.

6. The spraying apparatus of claim 1, further comprising: a wind skirt attached to or integral with the housing and extending down and surrounding the purge cap, nozzle tip body and the nozzle tip opening.

7. The spraying apparatus of claim 6, wherein the wind skirt has a first side, a second side and a third side.

8. The spraying apparatus of claim 1 wherein the first fluid comprises a friction modifying fluid for railroad rails.

9. The spraying apparatus of claim 1 wherein the first fluid comprises a water-based friction modifying fluid for railroad rails.

10. The spraying apparatus of claim 1 wherein each of the control fluid and the atomizing fluid comprises air.

11. The spraying apparatus of claim 1 wherein the nozzle body is made of aluminum.

12. A spraying apparatus for applying a friction modifying fluid, to a railroad rail, comprising:

a nozzle body disposed in a housing;

a fluid inlet conduit in fluid communication with ag in housing;

a fluid inlet disposed in the housing in fluid with a first fluid conduit defined by or disposed in the nozzle body; wherein the fir fluid conduit runs from fluid inlet to a hollow nozzle tin body disposed on and protruding through a bottom of housing and wherein fluid inlet is also disposed below, and in fluid communication with, the fluid inter conduit;

a control fluid poly and an atomizing fluid poly line each partially disposed in the housing and each respective portions external of the housing for connecting with the same fluid supply or respective fluid supplies;

wherein the control fluid supply fine injects a pressurized control fluid against a piston assembly disposed in a piston cavity; wherein piston assembly carries stopper needle which is biased towards hollow nozzle tin body by a spring so that the needle closes a nozzle tip opening of hollow nozzle tip body;

wherein the atomizing fluid supply line provides a pressurized atomizing fluid into hollow nozzle tip body to atomize the first fluid supplied by the first fluid conduit into the hollow nozzle tip body via a fluid cap disposed on the hollow nozzle tip body;

wherein in operation the control fluid supply line and the atomizing fluid supply line are operated simultaneously while the first fluid is supplied by the first fluid conduit into the hollow nozzle tip body via a fluid cap such that the pressurized control fluid injected by control fluid supply line against a piston assembly displaces needle out of the nozzle tip opening and allows the first fluid to exit out of the nozzle tip opening where the first fluid is atomized by the pressurized atomizing fluid supplied by the atomizing fluid supply line; and a temperature sensor disposed within the housing.

13. The spraying apparatus of claim 12, further comprising a heating element disposed in the nozzle body for heating nozzle body and a first fluid disposed in fluid inlet and/or in the first fluid conduit therein.

14. The spraying apparatus of claim 13, wherein the temperature sensor comprises a resistance temperature detector (RTD).

15. The spraying apparatus of claim 14 wherein the RTD is in contact with the first fluid conduit and/or the first fluid contained therein for measuring the temperature of the first fluid disposed therein.

16. The spraying apparatus of claim 13 wherein the temperature sensor is in contact with the first fluid conduit and/or the first fluid contained therein for measuring the temperature of the first fluid disposed therein.

17. A spraying apparatus for applying a friction modifying fluid to a railroad rail, comprising:

a nozzle body disposed in a housing;

a fluid inlet conduit in fluid communication with an opening in housing;

a fluid inlet disposed in the housing in fluid communication with a first fluid conduit defined by or disposed in the nozzle body, wherein the first fluid conduit runs from fluid inlet to a hollow nozzle tip body disposed on and protruding through a bottom of housing and wherein fluid inlet is also disposed below, and in fluid communication with the fluid inlet conduit;

a control fluid supply line and an atomizing fluid supply line each partially disposed in the housing and each having respective portions external of the housing for connecting with the same fluid supply or respective fluid supplies, wherein the control fluid supply line injects a pressurized control fluid against a piston assembly disposed in a piston cavity; wherein the piston assembly carries stopper needle which is biased towards hollow nozzle tip body by a spring so that the needle closes a nozzle tip opening of hollow nozzle tip body;

wherein the atomizing fluid supply line provides a pressurized atomizing fluid into hollow nozzle tip body atomize the first fluid supplied by the first fluid conduit into the hollow nozzle tip body via a fluid cap disposed on the hollow nozzle tip body;

wherein in operation the control fluid supply line and the atomizing fluid supply line are operated simultaneously while the first fluid is supplied by the first fluid conduit into the hollow nozzle tip body via a fluid can such that the pressurized control fluid injected by control fluid supply line against a piston assembly displaces needle nozzle tip opening and allows the first fluid to exit out of the nozzle tin opening where the first fluid is atomized by the pressurized atomizing fluid supplied by the atomizing fluid supply line;

wherein the nozzle body is surrounded by an insulating material.

18. The spraying apparatus of claim 17 wherein the insulating material comprises a closed cell elastomeric foam.

* * * * *